United States Patent [19]

Enami

[11] Patent Number: 4,877,351

[45] Date of Patent: Oct. 31, 1989

[54] APPARATUS FOR ADJUSTING A WATER LEVEL OF A LOCK

[75] Inventor: Yasushi Enami, Kodaira, Japan

[73] Assignee: Bridgestone Corporation, Tokyo, Japan

[21] Appl. No.: 239,360

[22] Filed: Sep. 1, 1988

[30] Foreign Application Priority Data

Sep. 9, 1987 [JP] Japan .................. 62-226065

[51] Int. Cl.[4] .............................. E02C 5/00
[52] U.S. Cl. .................................. 405/86; 405/3; 405/115; 405/85
[58] Field of Search ............... 405/86, 85, 84, 3, 4, 405/5, 6, 115

[56] References Cited

U.S. PATENT DOCUMENTS 4,149,469  4/1979  Bigler .................. 405/3 X

FOREIGN PATENT DOCUMENTS 218969  1/1962  Austria .................. 405/86
1004521  3/1983  U.S.S.R. .
1237742  4/1986  U.S.S.R. .................. 405/85

Primary Examiner—Randolph A. Reese
Assistant Examiner—J. Russell McBee
Attorney, Agent, or Firm—Sughrue, Mion, Zinn, Macpeak & Seas

[57] ABSTRACT

An apparatus for the adjustment of the water level in a lock comprises at least one fluid chamber arranged on a bottom or a bottom and a sidewall of a lock room between lock gates. The adjustment of the water level is performed by the supply and discharge of air in the fluid chamber through an air supply and discharge pipe.

7 Claims, 10 Drawing Sheets

FIG_17
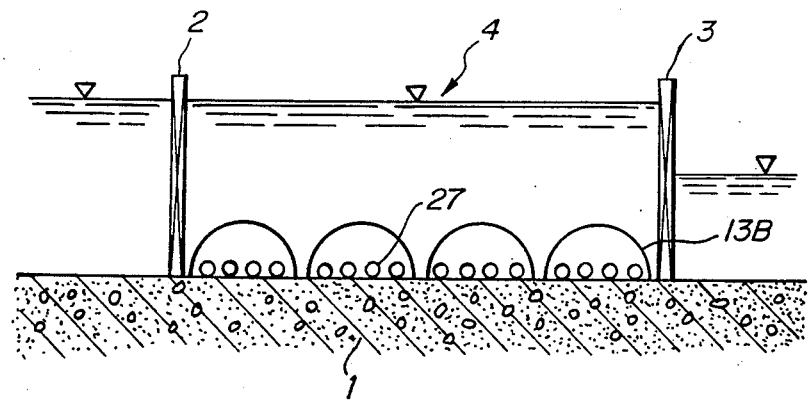
FIG_18
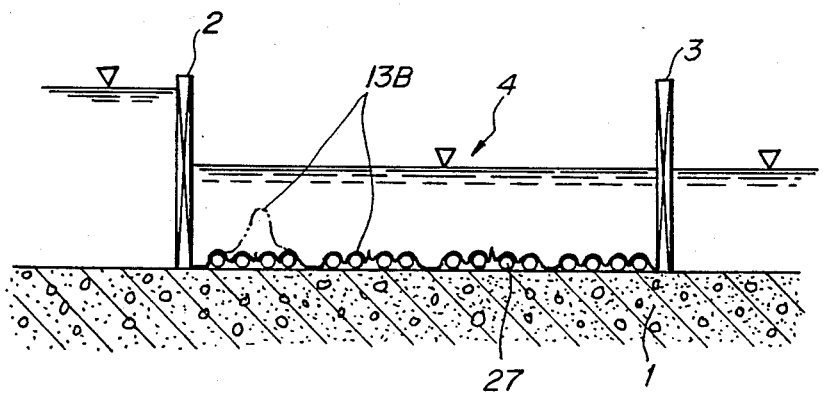

APPARATUS FOR ADJUSTING A WATER LEVEL OF A LOCK

BACKGROUND OF THE INVENTION

1. Field of the Invention

This invention relates to an apparatus for adjusting the water level of a lock arranged in a canal.

2. Related Art Statement

In a canal connecting two water zones having a level difference to each other, a lock comprising plural lock gates is arranged over a full length of the canal and a vessel is placed in a lock room between the lock gates. Then, the lock gate is opened between the adjoining lock rooms, whereby water flows from a high water-level side into a low water-level side to adjust the water level between the lock rooms to thereby move the vessel therebetween.

In this conventional system, there are the following drawbacks:

(i) Since water always flows between the lock rooms from high water-level side to low water-level side, the water level at the high water-level side should be maintained at an adequate value and consequently the adjustment of the water level takes a too long time; and (ii) When the level difference in a large-scale canal is large, it is required to use a large amount of water in the locking operation. Therefore, if the high level water zone is lakes and marshes, there is a fear of drying up the water.

SUMMARY OF THE INVENTION

The invention is designed under the above technical background and is to provide an apparatus for adjusting the level of a lock which can conduct the water-level adjustment between lock rooms in a short time and lessen water loss (flowing toward downstream side) as far as possible.

The above object and other objects can be achieved by such a structure that at least one collapsible fluid chamber is arranged in a bottom or a bottom and sidewall face of a lock room between lock gates and inflated by supplying air into the fluid chamber through an air supply means to raise water level in the lock room and deflated by discharging air from the inflated fluid chamber to descend water level in the lock room.

BRIEF DESCRIPTION OF THE DRAWINGS

The invention will be described with reference to the accompanying drawings, wherein:

FIGS. 15 to 19 are sectional views of seventh to eleventh embodiments of the apparatus for the water level adjustment of the lock according to the invention in the flowing direction of the canal, respectively;

DESCRIPTION OF THE PREFERRED EMBODIMENTS

The invention will be described in detail with reference to FIGS. 1 and 2.

Figure 1:
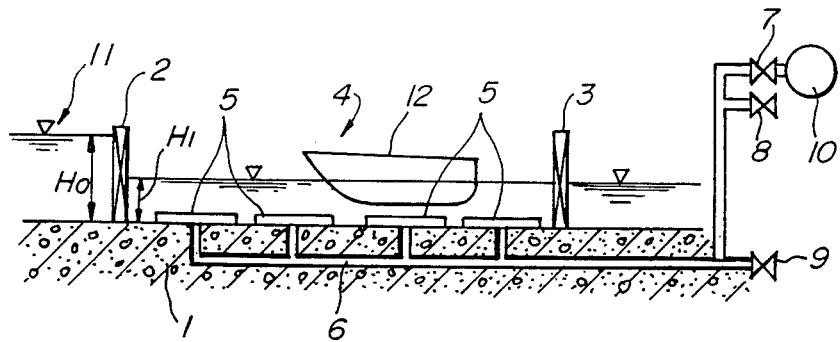
FIG. 1 is a sectional view of an embodiment of the apparatus for the water level adjustment of the lock illustrating the theory of the invention in a flowing direction of a canal (at a deflated state of the bag-like body constituting the fluid chamber)

FIG. 1 is a longitudinally sectional view of a canal cut along the flowing direction thereof. Reference numerals 2 and 3 are lock gates defining a lock room 4. A plurality of bag-like bodies 5 made of a flexible sheet material (for example, rubber sheet reinforced with a canvas), each defining a fluid chamber, are arranged on a surface of a riverbed 1 in the lock room 4. Each of these bag-like bodies 5 communicates with an air supply source 10 through an air discharge pipe 6 embedded in the riverbed 1. As shown in FIG. 2, the bag-like bodies 5 are inflated by closing a discharge valve 8 and a drainage valve 9 and opening a supply valve 7 and then supplying air into the bag-like bodies 5.

Therefore, when the bag-like bodies are arranged over the entire in the bottom of the lock room 4 (surface of the riverbed 1) or the bottom and sidewall (riverbank) at given intervals, the water level corresponding to a depth $H_1$ before the inflation of the bag-like bodies changes into a water level $H_2$ after the inflation of the bag-like bodies. If this water level $H_2$ is equal to a water level $H_0$ of an adjoining lock room 11 at the high water-level side, the lock gate 2 can be opened to move a vessel 12 from the lock room 4 to the lock room 11. In this case, it should be noticed that the movement of water is not caused between the lock rooms 4 and 11.

Then, when the lock gate 2 is closed and the discharge valve 8 is opened (in this case, the air supply source is previously stopped and the supply valve is closed), air filled in the bag-like bodies is discharged through the discharge valve 8 to the atmosphere. Thus, each of the bag-like bodies 5 is deflated and hence the water level in the lock room 4 returns back to the original level $H_1$.

Now, in order to match the water level $H_2$ obtained by inflating each of the bag-like bodies 5 at maximum in the lock room 4 with the upper water level $H_0$ of the lock room 11, it is preferable to properly select the shape of each of the bag-like bodies 5 obtained at the inflation state and gradually reduce the volume of space between the inflated bag-like bodies 5. This is because, when the top of each of the inflated bag-like bodies 5 becomes too near to the water surface, the draft of the vessel can not be ensured and the vessel comes into contact with the bag-like bodies 5. Moreover, the shape of the bag-like body at the inflated state is considered to be globular, cylindrical in up and down directions, cylindrical in lateral direction and the like.

According to the above structure of the apparatus for adjusting the water level in the lock, there are obtained the following advantages:

(1) It is not required to move water between the lock rooms, so that the flowing out of water toward the downstream side is prevented;

(2) It is not required to ensure a large amount of water owing to the above item (1), so that this apparatus is suitable for use in a large-scale canal;

(3) The supply and discharge of air in the bag-like bodies 5 can be rapidly performed, and the adjustment of water level in the lock room does not take a long time, so that the waiting time of the vessel becomes short.

Figure 2:
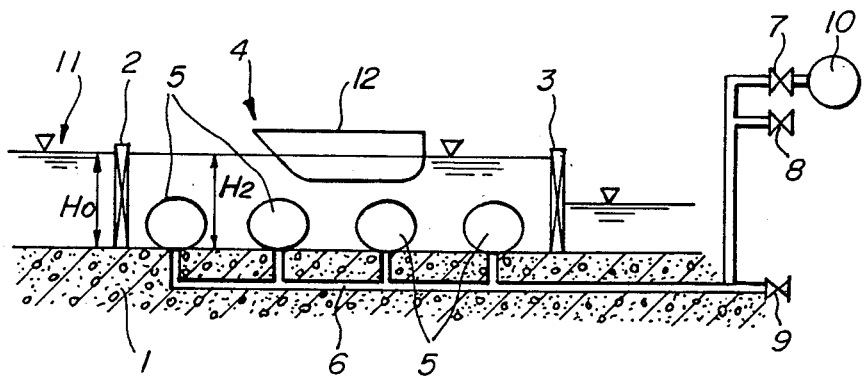
FIG. 2 is a sectional view of the apparatus for the water level adjustment of the lock at an inflated state of the bag-like body.

Moreover, the bag-like bodies are not omitted in both lock rooms adjacent to the lock room 4 in FIGS. 1 and 2, but they are actually arranged in both lock rooms (This is similarly applied to the following cases).

How, the invention will be described with reference to the embodiments shown in FIGS. 3 to 21.

Figure 3:
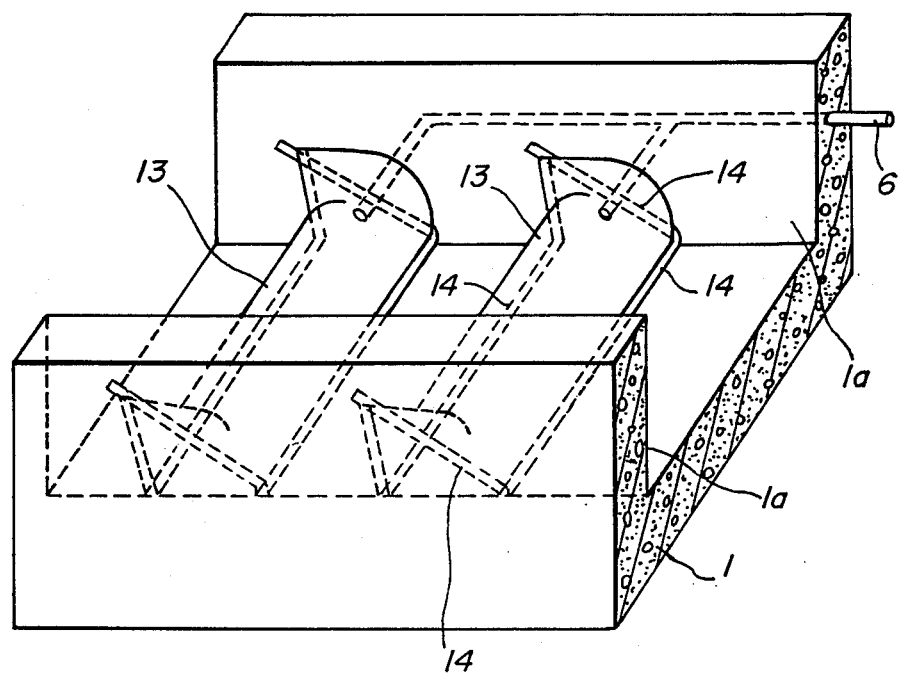
FIG. 3 is a perspective view of a main part in a first embodiment of the apparatus for the water level adjustment of the lock according to the invention.
Figure 4:
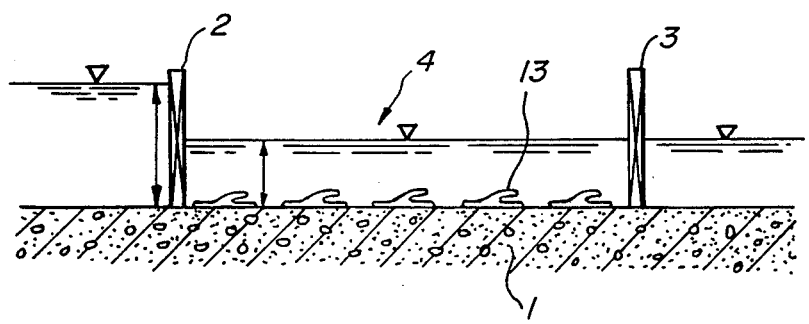
FIGS. 4 and 5 are sectional views of the apparatus shown in FIG. 3 at deflated state and inflated state of the bag-like bodies in a flowing direction of a canal, respectively.
Figure 5:
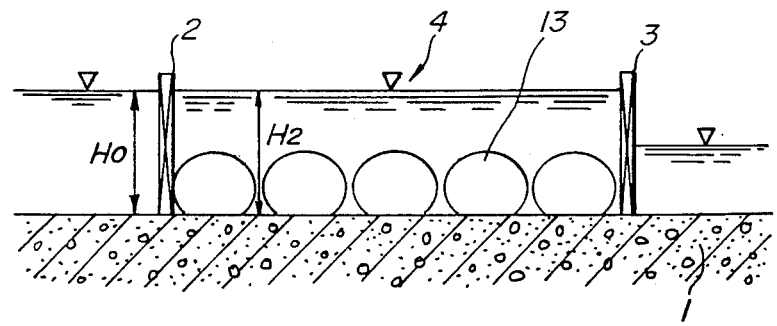

(A) As to FIGS. 3 to 5:

In this embodiment, plural bag-like bodies 13 each defining an air chamber are arranged on the riverbed 1 and along both sidewall faces 1a of a canal in the widthwise direction of the canal. Each of these bag-like bodies 13 is formed by airtightly and liquid-tightly securing a flexible sheet material at its whole peripheral edge portion to the riverbed 1 and sidewall face 1a. As shown in FIG. 3, air is supplied and discharged through an air supply and discharge pipe 6 embedded in one of both sidewall faces 1a. FIGS. 3 and 5 show an inflated state of the bag-like bodies 13, while FIG. 4 shows a deflated state of the bag-like bodies 13. These bag-like bodies are arranged so as to sufficiently approach to each other without coming into contact with each other even in the case of inflation and deflation. The adjustment of water level by the inflation and deflation of the bag-like bodies 13 is the same as in the first embodiment.

The above structure of the apparatus for the adjustment of water level in the lock has a merit that the air chambers can be formed by the bag-like bodies 13 over the full width of the canal even along both sidewall faces 1a, and a water depth from water surface to a top of the inflated bag-like body 13 can be ensured at a sufficiently large value.

Figure 6:
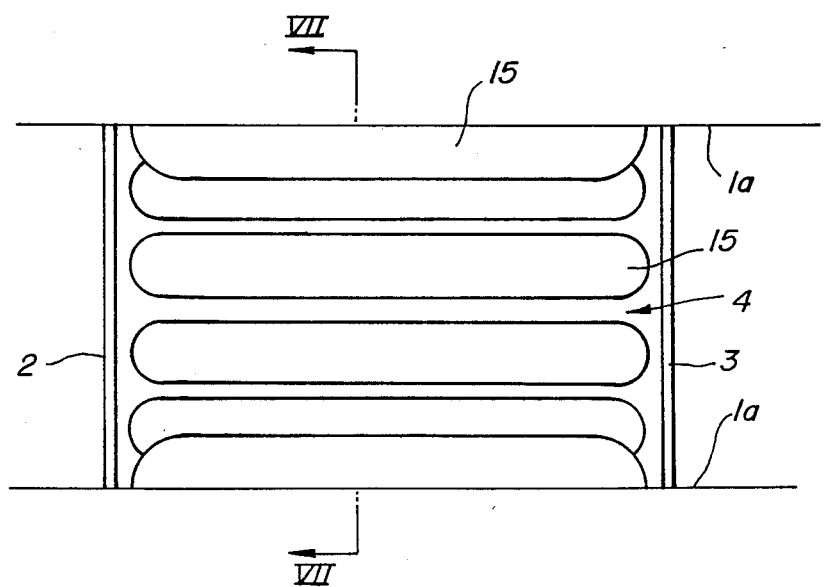
FIG. 6 is a plan view of a second embodiment of the apparatus for the water level adjustment of the lock according to the invention.
Figure 7:
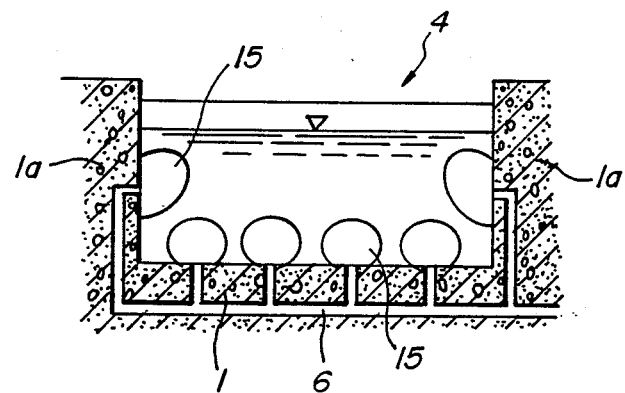
FIG. 7 is a sectional view taken along a line VII—VII of FIG. 6.

(B) As to FIGS. 6 and 7:

This embodiment is a modified case of FIGS. 3 to 5, wherein plural bag-like bodies 15 are longitudinally arranged along the riverbed 1 and the sidewall face 1a in the flowing direction of the canal. In this case, each of these bag-like bodies 15 can be continuously elongated and the number of the bodies arranged can be reduced as compared with the case of using the bag-like bodies 13, and also the water depth from the water surface to the top of the inflated bag-like body can be made further deeper.

Figure 8:
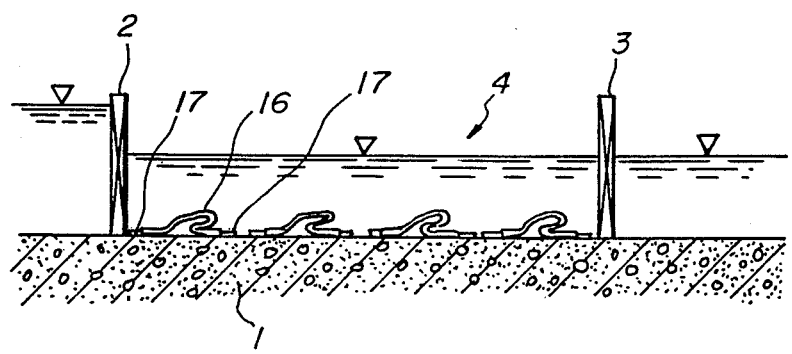
FIG. 8 is a sectional view of a third embodiment of the apparatus for the water level adjustment of the lock according to the invention in the flowing direction of the canal (at the deflated state of the bag-like bodies)
Figure 9:
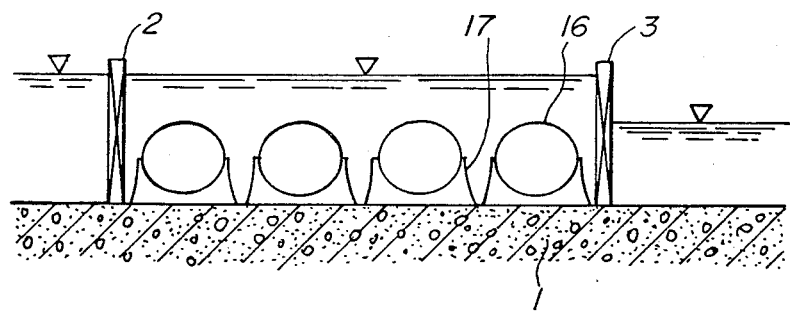
FIG. 9 is a sectional view of the apparatus shown in FIG. 8 at the inflated state of the bag-like bodies.

(C) As to FIGS. 8 and 9:

In this embodiment, plural cylindrical bag-like bodies 16 are secured to the riverbed 1 through fastening cables 17 (e.g. chain, wire rope or the like) in the widthwise direction of the canal. As shown in FIG. 8, the bag-like bodies 16 settle down toward the riverbed 1 after the discharge of air from the inflated bag-like bodies 16, while they float upward after the supply of air as shown in FIG. 9. In this case, in order to ensure the large depth from the water surface to the top of the bag-like body as far as possible, the length of the fastening cable 17 is made shorter as far as possible. Particularly, it is preferable that the bottom of the inflated bag-like body come into contact with the riverbed 1.

Figure 10:
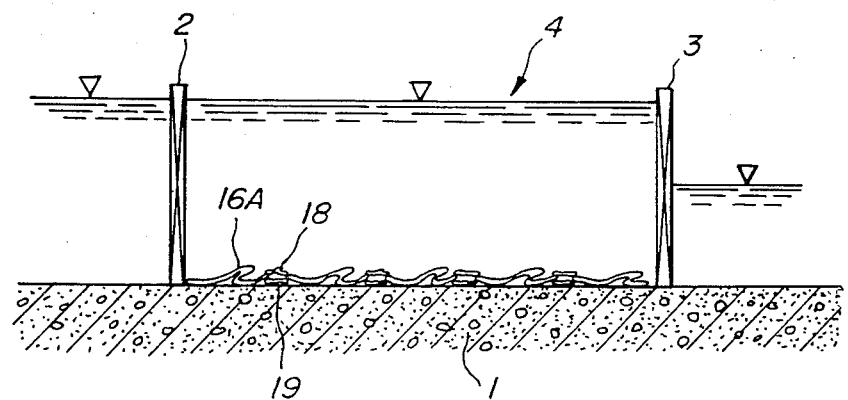
FIG. 10 is a sectional view of a fourth embodiment of the apparatus for the water level adjustment of the lock according to the invention in the flowing direction of the canal (at the deflated state of the bag-like bodies)
Figure 11:
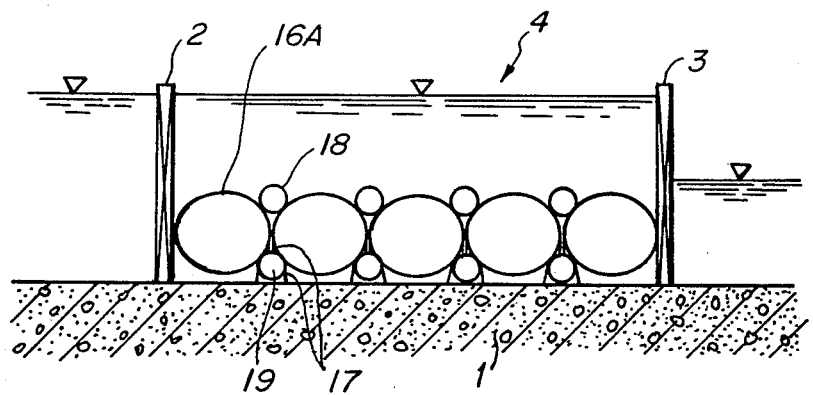
FIG. 11 is a sectional view of the apparatus shown in FIG. 10 at the inflated state of the bag-like bodies.

(D) As to FIGS. 10 and 11:

This embodiment is a modified case of FIGS. 8 and 9, wherein plural pairs of cylindrical small-size bag-like bodies 18 and 19 are across the canal along the bag-like bodies 16A to embed a small space portion between the adjoining bag-like bodies 16A. The upper small-size bag-like body 18 is integrally united to the two adjacent bag-like bodies 16A at a state of connecting these bag-like bodies 16A to each other, while the lower small-size bag-like body 19 is secured to the riverbed 1 through fastening cables 17 and also two fastening cables 17, 17 supporting the two-bag-like bodies 16A are bonded to the top of the lower small-size bag-like body 19.

Thus, in the structure of arranging the small-size bag-like bodies 18, 19 in the space portion between the adjoining bag-like bodies 16A, the water depth from the water surface to the tops of the bag-like bodies 16A and 18 can be made further deeper than that of FIGS. 8 and 9.

Figure 12:
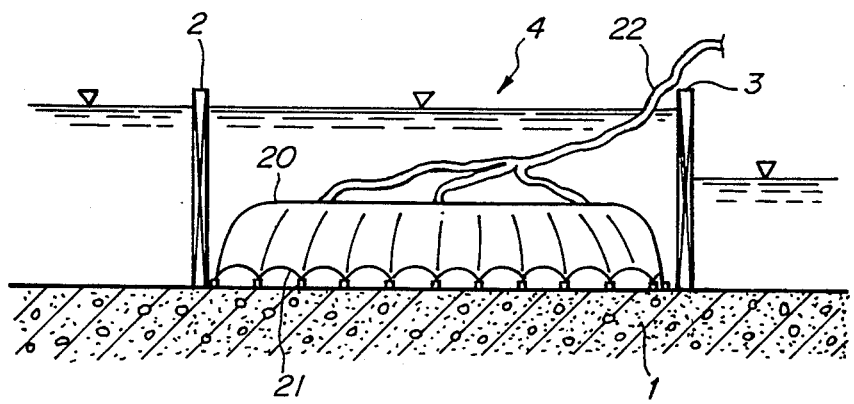
FIG. 12 is a sectional view of a fifth embodiment of the apparatus for the water level adjustment of the lock according to the invention in the flowing direction of the canal.

(E) As to FIG. 12:

In this embodiment, the flexible sheet material is shaped into a parachute-like body 20 by fixing the whole peripheral edge portion 21 of this material to the riverbed 1 at many positions without forming the bag-like body. When air is supplied to the inside of the parachute-like body 20 through an air supply and discharge pipe 22 connected to the top of the parachute-like body 20, as shown in FIG. 12, the parachute-like body 20 is inflated to raise the water level inside the lock room 4. On the other hand, when air is discharged from the inflated parachute-like body through the pipe 22, the parachute-like body 20 is deflated so as to locate along the surface of the riverbed 1.

Figure 13:
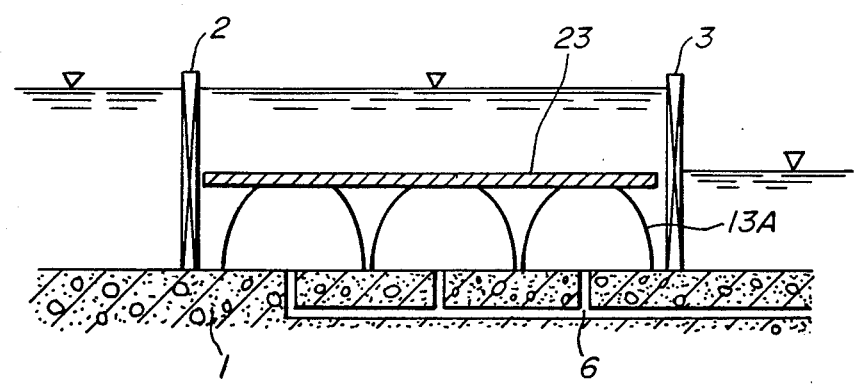
FIG. 13 is a sectional view of a sixth embodiment of the apparatus for the water level adjustment of the lock according to the invention in the flowing direction of the canal.
Figure 14:
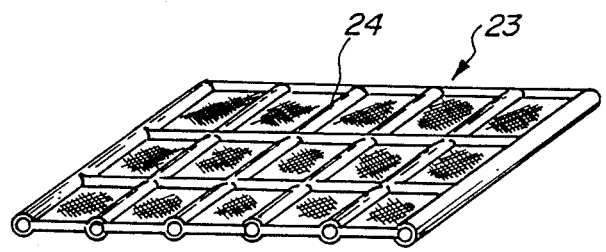
FIG. 14 is a perspective view of a large rigidity plate used in the apparatus of FIG. 13.

(F) As to FIGS. 13 and 14:

This embodiment is a modified case of FIGS. 3 to 5, wherein a high rigidity plate (made of, for example, a synthetic resin) is fixed to the tops of the plural bag-like bodies 13A arranged across the canal so as to cover these bag-like bodies. This plate 23 has a lattice float portion 24 filled therein with a low specific gravity material (e.g. foamed resin material) as shown in FIG. 14. The float portion 24 serves to give a minimum weight required for descending the deflated bag-like bodies 13A along the riverbed 1 to the plate 23 and also acts to increase the rigidity of the plate 23 owing to the large thickness. On the other hand, the plate 23 serves to prevent the direct contact between the inflated bag-like bodies 13A and the vessel and acts as a guide plate for the moving vessel.

Figure 15:
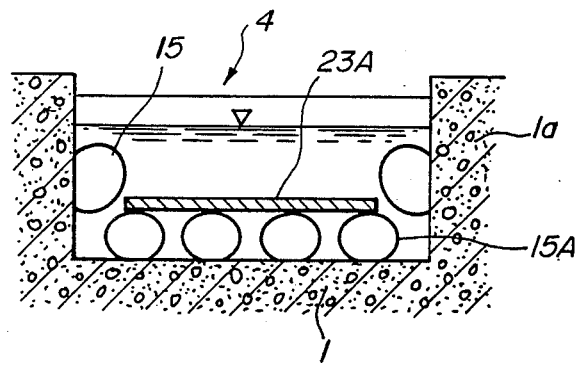

(G) As to FIG. 15:

This embodiment is a modified case of FIGS. 6 and 7, wherein the same large rigidity plate 23A as in the embodiment of FIGS. 13 and 14 is fixed to the tops of the bag-like bodies 15A arranged along the riverbed 1. In this case, the plate 23A may be divided so as to separately place on each of the bag-like bodies 15A.

Figure 16:
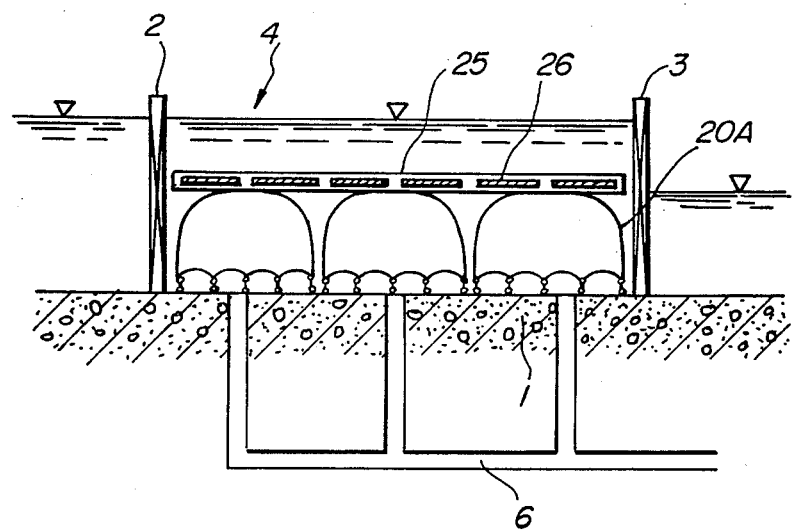

(H) As to FIG. 16:

This embodiment is a modified case of FIG. 12, wherein the same large rigidity plate 25 as in the embodiment of FIGS. 13 and 14 is fixed to the tops of plural parachute-like bodies 20A arranged along the riverbed 1. In this case, a low specific gravity material 26, such as a foamed resin material, is embedded in the plate 25.

(I) As to FIGS. 17 and 18:

This embodiment is a modified case of FIGS. 3 to 5, wherein a plurality of tubular members 27 (or rod members) are located inside an air chamber of each of plural bag-like bodies 13B arranged across the canal on the riverbed 1 and fixed to the surface of the riverbed 1 so as to extend over the whole length of the bag-like body 13B. The tubular members 27 give unevenness to the surface of the riverbed 1 to thereby stabilize the deflated state of the bag-like body 13B along the riverbed 1 because an extra portion of the sheet in the bag-like body 13B enters into a concave portion defined between the tubular members 27 during the deflation of the bag-like bodies 13B along the riverbed 1. A phantom line shown in FIG. 18 indicates a course of deflating the bag-like body 13B.

Figure 19:
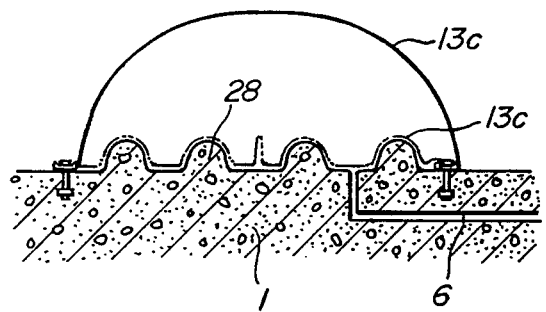

(J) As to FIG. 19:

This embodiment is a modified case of FIGS. 17 and 18. FIG. 19 shows an enlarged view of a bag-like body 13C arranged across the canal, wherein plural protrusions 28 extend on the surface of the riverbed 1 in the widthwise direction of the canal in the air chamber defined by the bag-like body 13C to make the surface of the riverbed 1 uneven. Moreover, a phantom line shows the deflated state of the bag-like body 13C.

Figure 20:
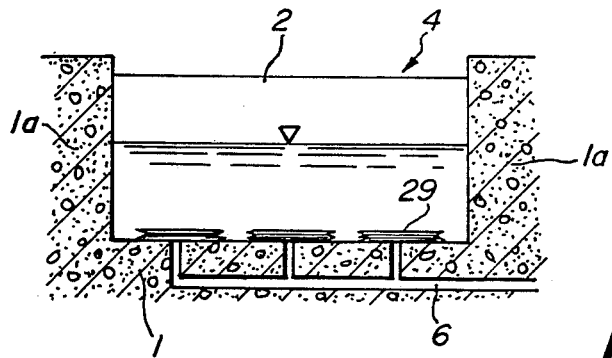
FIG. 20 is a sectional view of a twelfth embodiment of the apparatus for the water level adjustment of the lock according to the invention in the widthwise direction of the canal (at the deflated state of the bellows bodies)
Figure 21:
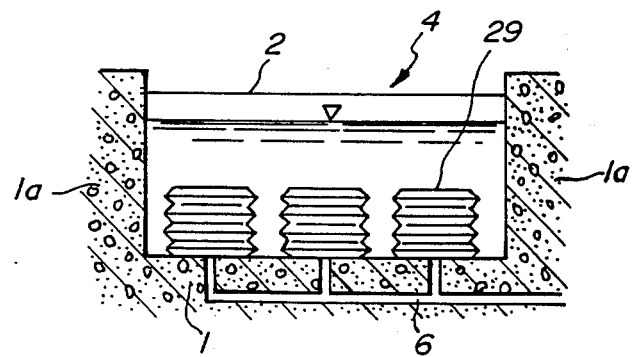
FIG. 21 is a sectional view of the apparatus shown in FIG. 20 at the inflated state of the bellows bodies.

(K) As to FIGS. 20 and 21:

These drawings show a vertically sectional view of a canal in the widthwise direction thereof, wherein plural bellows bodies 29 each made of a flexible sheet material are airtightly and liquid-tightly secured to the surface of the riverbed 1. When air is supplied to the deflated bellows bodies 29 (FIG. 20) through an air supply and discharge pipe 6, the bellows bodies 29 are inflated as shown in FIG. 21. In this embodiment, when the plural bellows bodies 29 are arranged along the widthwise direction and the flowing direction of the canal, the air supply and discharge pipe 6 may be set in such a manner that the inflated height of the bellows body 29 is made low at a position contacting with the vessel and that of the other bellows bodies is made high, while the height of the inflated bellows body contacting with the vessel is made lower together with the movement of the vessel and the bellows bodies changed from the contact state to non-contact state is gradually made higher. Thus, the height of the bellows body at the non-contact state can be made higher, whereby the large water depth can be ensured at only the necessary position.

This means can be applied to the case of FIGS. 6 and 7 in which the bag-like body is divided into plural independent air chambers in the flowing direction of the canal.

Moreover, the same plate as in the plate 23 or 25 may be fixed to the tops of the bellows bodies 29. In this case, it is sufficient to attach the divided plate segment to each of the bellows bodies 29 for controlling the heights of the bellows bodies.

As mentioned above, in the apparatus for adjusting the water level of the lock according to the invention, a plurality of inflatable and deflatable air chambers are arranged on the bottom surface of the lock room between the lock gates or the bottom and sidewall surfaces of the lock room, and consequently the water level of the lock room can freely be adjusted by supplying air into the air chambers through an air supply and discharge pipe and discharging air from the inflated air chambers therethrough.

Therefore, the adjustment of the water level in the lock room can rapidly be performed by the supply and discharge of air in the air chambers, and also the loss of water toward the downstream side as in the conventional apparatus can be prevented. Thus, the apparatus according to the invention is suitable for use in large-scale canals and has a great merit in economy.

What is claimed is:

1. An apparatus for adjusting a water level of a lock, comprising: at least one collapsible fluid chamber arranged on a bottom of a lock room between lock gates in the lock, said fluid chamber comprising a parachute-like body made of a flexible sheet material fixed to the bottom of said lock room at peripheral edges thereof, means for supplying air into the fluid chamber to raise the water level in the lock room and wherein said fluid chamber is deflated by discharging air therein to lower the water level in the lock room.

2. The apparatus of claim 1 wherein said parachute-like body comprises a single sheet extending substantially the length of said lock room and said means for supplying air comprises a supply and discharge pipe connected to the top of said parachute-like body.

3. The apparatus of claim 2 wherein said means for supplying air comprises a pipe having branches connected to the top of said parachute-like body at separated points.

4. The apparatus of claim 1 wherein said parachute-like body comprises a plurality of parachute-like bodies arranged along the riverbed each of said parachute-like bodies separately secured to said bottom of said lock room.

5. The apparatus of claim 4 further comprising a plate fixed to the tops of said parachute-like bodies.

6. The apparatus of claim 5 further comprising a low specific gravity material embedded in said plate.

7. The apparatus of claim 1 wherein said means for supplying air comprises an air pipe in said riverbed opening to the surface under said parachute-like body.

* * * * *